United States Patent Office 3,466,274
Patented Sept. 9, 1969

3,466,274
FLUORENO-[1,9-ef]-1,4-DIAZEPINE-1-OXIDES AND
1,3-DIAZAFLUORANTHENE-1-OXIDES
René R. De Ridder, Brussels, Belgium, assignor to Manufacture de Produits Pharmaceutiques a Christiaens Societe Anonyme, Brussels, Belgium
No Drawing. Filed July 1, 1965, Ser. No. 468,952
Claims priority, application Great Britain, July 6, 1964, 27,794/64
Int. Cl. C07d 53/02, 51/48; A61k 27/00
U.S. Cl. 260—239                    15 Claims

ABSTRACT OF THE DISCLOSURE

This invention is directed to certain novel fluoreno-[1,9-ef]-1,4-diazepine-1-oxides and certain novel precursor 1,3-diazafluoranthrene-1-oxides. These compounds are useful as sedatives, tranquilizers, hypnotics, anticonvulsants, antispasmodics and other pharmaceutical purposes.

This invention relates to new derivatives of 1-aminofluorenone.

The main compounds according to this invention are the fluoreno-[1,9-ef]-1,4-diazepine-1-oxides having the following general formula:

[Structural formula I showing fluoreno-[1,9-ef]-1,4-diazepine-1-oxide with substituents $R_1$, $R_2$, $R_3$, $R_4$, $R_5$ and numbered positions 4, 5, 6, 7, 8, 9, 10, 11, 2C, 1N, 3C, and O]

(I)

in which $R_3$ and $R_5$ represent hydrogen or a lower alkyl group, $R_4$ represents hydrogen or a halogen such as chlorine, the $R_4$ group being in position 5 or 7, $R_1$ and $R_2$, which may be identical or different, represent hydrogen, a lower alkyl containing 1 to 6 carbon atoms, alkenyl, allyl, benzyl, alkylaryl, hydroxyalkyl, amino, guanidino, furfuryl or alkyl-heterocyclic group, or $R_1$ and $R_2$ form, together with the adjacent nitrogen atom, (1) a dialkylaminoalkylamino group, (2) a group of the formula NH-alkyl-N$\langle \;\; \rangle$, in which N$\langle \;\; \rangle$ is a nitrogenous heterocyclic group which may be substituted, or (3) an heterocyclic group which may be substituted, such as an ethyleneimino, morpholino, piperidino, pyrrolidino, hexamethyleneimino, N-methylpiperazino, N-β-hydroxyethylpiperazino or N-benzylpiperazino.

The invention also relates to the acid addition salts, such as the hydrochlorides, of the fluoreno-[1,9-ef]-1,4-diazepine-1-oxides of Formula I.

Among the new compounds of Formula I, the following may be cited:

3-amino-2H-fluoreno-[1,9-ef]-1,4-diazepine-1-oxide and the hydrochloride thereof;
3-dimethylamino-2H-fluoreno-[1,9-ef]-1,4-diazepine-1-oxide and the hydrochloride thereof;
3-methylamino-2H-fluoreno-[1,9-ef]-1,4-diazepine-1-oxide and the hydrochloride thereof;
3-methylamino-2H-2-methyl-fluoreno-[1,9-ef]-1,4-diazepine-1-oxide and the hydrochloride thereof;
3-methylamino-2H-2,2-dimethyl-fluoreno-[1,9-ef]-1,4-diazepine-1-oxide and the hydrochloride thereof;
3-ethylamino-2H-fluoreno-[1,9-ef]-1,4-diazepine-1-oxide and the hydrochloride thereof;
3-propylamino-2H-fluoreno-[1,9-ef]1,4-diazepine-1-oxide and the hydrochloride thereof;
3-isopropylamino-2H-fluoreno-[1,9-ef]-1,4-diazepine-1-oxide and the hydrochloride thereof;
3-sec.-butylamino-2H-fluoreno-[1,9-ef]-1,4-diazepine-1-oxide and the hydrochloride thereof;
3-n-butylamino-2H-fluoreno-[1,9-ef]-1,4-diazepine-1-oxide and the hydrochloride thereof;
3-isobutylamino-2H-fluoreno-[1,4-ef]-1,4-diazepine-1-oxide and the hydrochloride thereof;
3-n-amylamino-2H-fluoreno-[1,9-ef]-1,4-diazepine-1-oxide and the hydrochloride thereof;
3-isoamylamino-2H-fluoreno-[1,9-ef]-1,4-diazepine-1-oxide and the hydrochloride thereof;
3-hexylamino-2H-fluoreno-[1,9-ef]-1,4-diazepine-1-oxide and the hydrochloride thereof;
3-hydrazino-2H-fluoreno-[1,9-ef]-1,4-diazepine-1-oxide and the hydrochloride thereof;
3-allylamino-2H-fluoreno-[1,9-ef]-1,4-diazepine-1-oxide and the hydrochloride thereof;
3-guanidinamino-2H-fluoreno-[1,9-ef]-1,4-diazepine-1-oxide and the hydrochloride thereof;
3-cyclohexylamino-2H-fluoreno-[1,9-ef]-1,4-diazepine-1-oxide and the hydrochloride thereof;
3-(2-murfurylamino)-2H-fluoreno-[1,9-ef]-1,4-diazepine-1-oxide and the hydrochloride thereof;
3-(β-phenylethylamino)-2H-fluoreno-[1,9-ef]-1,4-diazepine-1-oxide and the hydrochloride thereof;
3-(N-β-morpholino)ethylamino-2H-fluoreno-[1,9-ef]-1,4-diazepine-1-oxide and the hydrochloride thereof;
3-(β-diethylaminoethyl)amino-2H-fluoreno-[1,9-ef]-1,4-diazepine-1-oxide and the hydrochloride thereof;
3-benzylamino-2H-fluoreno-[1,9-ef]-1,4-diazepine-1-oxide and the hydrochloride thereof;
3-(β-hydroxyethyl)amino-2H-fluoreno-[1,9-ef]-1,4-diazepine-1-oxide and the hydrochloride thereof;
3-pyrrolidino-2H-fluoreno-[1,9-ef]-1,4-diazepine-1-oxide and the hydrochloride thereof;
3-piperidino-2H-fluoreno-[1,9-ef]-1,4-diazepine-1-oxide and the hydrouhloride thereof;
3-hexamethyleneimino-2H-fluoreno-[1,9-ef]-1,4-diazepine-1-oxide and the hydrochloride thereof;
3-(N-methylpiperazinyl)-2H-fluoreno-[1,9-ef]-1,4-diazepine-1-oxide and the hydrochloride thereof;
3-ethyleneimino-2H-fluoreno-[1,9-ef]-1,4-diazepine-1-oxide and the hydrochloride thereof;
3-morpholino-2H-fluoreno-[1,9-ef]-1,4-diazepine-1-oxide and the hydrochloride thereof;
3-piperazino-2H-fluoreno-[1,9-ef]-1,4-diazepine-1-oxide and the hydrochloride thereof;
3-(2-methyl-N-piperazinyl)-2H-fluoreno-[1,9-ef]-1,4-diazepine-1-oxide and the hydrochloride thereof;
3-(N-β-hydroxyethyl-piperazinyl)-2H-fluoreno-[1,9-ef]-1,4-diazepine-1-oxide and the hydrochloride thereof;
3-(N-benzylpiperazinyl)-2H-fluoreno-[1,9-ef]-1,4-diazepine-1-oxide and the hydrochloride thereof;
7-chloro-3-amino-2H-fluoreno-[1,9-ef]-1,4-diazepine-1-oxide and the hydrochloride thereof;
7-chloro-3-dimethylamino-2H-fluorene-[1,9-ef]-1,4-diazepine-1-oxide and the hydrochloride thereof;
7-chloro-3-methylamino-2H-fluoreno-[1,9-ef]-1,4-diazepine-1-oxide and the hydrochloride thereof;
7-chloro-3-ethylamino-2H-fluoreno-[1,9-ef]-1,4-diazepine-1-oxide and the hydrochloride thereof;
7-chloro-3-propylamino-2H-fluoreno-[1,9-ef]-1,4-diazepine-1-oxide and the hydrochloride thereof;
7-chloro-3-butylamino-2H-fluoreno-[1,9-ef]-1,4-diazepine-1-oxide and the hydrochloride thereof;
7-chloro-3-allylamino-2H-fluoreno-[1,9-ef]-1,4-diazepine-1-oxide and the hydrochloride thereof;

7-chloro-3-benzylamino-2H-fluoreno[1,9-ef]-1,4-diazepine-1-oxide and the hydrochloride thereof;
7-chloro-3-piperidino-2H-fluoreno-[1,9-ef]-1,4-diazepine-1-oxide and the hydrochloride thereof;
7-chloro-3-pyrrolidino-2H-fluoreno-[1,9-ef]-1,4-diazepine-1-oxide and the hydrochloride thereof;
7-chloro-3-(N-benzylpiperazinyl)-2H-fluoreno-[1,9-ef]-1,4-diazepine-1-oxide and the hydrochloride thereof;
7-chloro-3-piperazino-2H-fluoreno-[1,9-ef]-1,4-diazepine-1-oxide and the hydrochloride thereof;
7-chloro-3-(N-methylpiperazinyl)-2H-fluoreno-[1,9-ef]-1,4-diazepine-1-oxide and the hydrochloride thereof;
7-chloro-3-(N-β-hydroxyethylpiperazinyl)-2H-fluoreno-[1,9-ef]-1,4-diazepine-1-oxide and the hydrochloride thereof;
5-chloro-3-amino-2H-fluoreno-[1,9-ef]-1,4-diazepine-1-oxide and the hydrochloride thereof;
5-chloro-3-ethylamino-2H-fluoreno-[1,9-ef]-1,4-diazepine-1-oxide and the hydrochloride thereof;
5-chloro-3-methylamino-2H-fluoreno-[1,9-ef]-1,4-diazepine-1-oxide and the hydrochloride thereof;
5-chloro-n-propylamino-2H-fluoreno-[1,9-ef]-1,4-diazepine-1-oxide and the hydrochloride thereof;
5-chloro-3-n-butylamino-2H-fluoreno-[1,9-ef]-1,4-diazepine-1-oxide and the hydrochloride thereof;
5-chloro-3-pyrrolidino-2H-fluoreno-[1,9-ef]-1,4-diazepine-1-oxide and the hydrochloride thereof;
5-chloro-3-dimethylamino-2H-fluoreno-[1,9-ef]-1,4-diazepine-1-oxide and the hydrochloride thereof;
7-chloro-3-methylamino-2H-2-methyl-fluoreno-[1,9-ef]-1,4-diazepine-1-oxide and the hydrochloride thereof;
5-chloro-3-piperazino-2H-fluoreno-[1,9-ef]-1,4-diazepine-1-oxide and the hydrochloride thereof;
5-chloro-3-(N-methylpiperazinyl)-2H-fluoreno-[1,9-ef]-1,4-diazepine-1-oxide and the hydrochloride thereof;
5-chloro-3-[N-(β-hydroxyethyl)piperazinyl]-2H-fluoreno-[1,9-ef]-1,4-diazepine-1-oxide and the hydrochloride thereof;
5-chloro-3-(N-benzylpiperazinyl)-2H-fluoreno-[1,9-ef]-1,4-diazepine-1-oxide and the hydrochloride thereof;
5-chloro-3-methylamino-2H-2-methyl-fluoreno-[1,9-ef]-1,4-diazepine-1-oxide and the hydrochloride thereof.

The invention also relates to new compounds of the general formula:

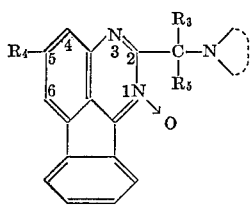

(II)

in which $R_3$, $R_4$ and $R_5$ have the above meanings and $N\underset{\phantom{.}}{\overset{\frown}{\phantom{.}}}$ represents a nitrogenous heterocyclic group which may be substituted, such as a morpholino, piperidino, hexamethyleneimino, piperazino or substituted piperazino group.

Among compounds of the Formula II, the following compounds as well as the hydrochlorides thereof may be cited as examples:

2-piperidinomethyl-1,3-diazafluoranthene-1-oxide,
2-hexamethyleneiminomethyl-1,3-diazafluoranthene-1-oxide,
2-morpholinomethyl-1,3-diazafluoranthene-1-oxide,
5-chloro-2-morpholinomethyl-1,3-diazafluoranthene-1-oxide,
7-chloro-2-morpholinomethyl-1,3-diazafluoranthene-1-oxide, The new compounds of the Formulae I and II may be formula:

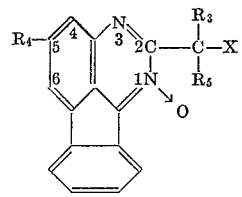

(III)

in which $R_3$ and $R_5$ represent hydrogen or lower alkyl, such as methyl; $R_4$ represents hydrogen or a halogen such as chlorine, $R_4$ being in position 4 or 6; and X represents a halogen, such as chlorine or bromine.

The compounds of Formula III are also new compounds contained in the scope of this invention. Among the compounds of Formula III, the following may be cited as examples:

2-chloromethyl-1,3-diazafluoranthene-1-oxide,
2-(α-chloroethyl)-1,3-diazafluoranthene-1-oxide,
2-bromomethyl-1,3-diazafluoranthene-1-oxide,
2-(α-bromoisopropyl)-1,3-diazafluoranthene-1-oxide,
6-chloro-2-chloromethyl-1,3-diazafluoranthene-1-oxide,
6-chloro-2-(α-chloroethyl)-1,3-diazafluoranthene-1-oxide,
4-chloro-2-chloromethyl-1,3-diazafluoranthene-1-oxide,
4-chloro-2-(α-chloroethyl)-1,3-diazafluoranthene-1-oxide.

Compounds of the Formulae I and II may be prepared from a compound of Formula III by reactions which may be represented as follows:

Reaction 1

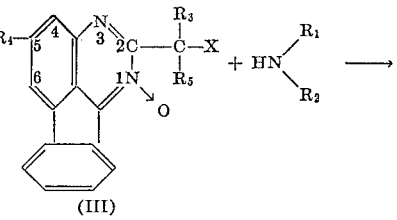

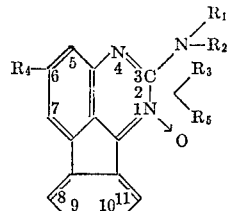

(I)

Reaction 2

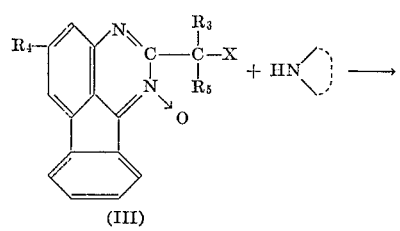

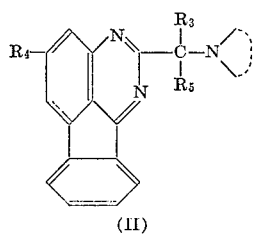

(II)

The compounds of the Formula I may be prepared, according to reaction 1, by reacting a compound of Formula III with an excess of a primary amine in a solvent such as methanol, benzene, chloroform or dioxane, preferably at room temperature.

In a first embodiment of this process, a compound of Formula III is reacted with an excess of a primary amine selected from ammonia, guanidine, hydrazine, methylamine, ethylamine, ethanolamine, propylamine, isopropylamine, allylamine, n-butylamine, isobutylamine, amylamine, isoamylamine, hexylamine, benzylamine and phenethylamine. This reaction directly causes a cyclic extension, the 6-membered nitrogenous ring of the compounds of Formula III being extended into a 7-membered nitrogenous ring in compounds of Formula I.

In a second embodiment of said process, a compound of Formula III is first reacted with an amine selected from sec.-butylamine, tert.-butylamine, cyclohexylamine and preferably, a tertiaryamine, such as triethylamine, in either methanol or ethanol. In this case, the compound of Formula III reacts with the solvent (methanol or ethanol) and the amine acts as an acid acceptor (for hydrochloric or hydrobromic acid) so that a compound of the following formula is obtained:

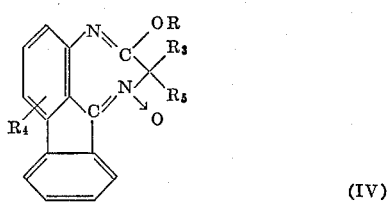

(IV)

in which R represents a lower alkyl group, such as methyl and ethyl; $R_4$ represents hydrogen or a halogen, such as chlorine; and $R_3$ and $R_5$ represent hydrogen or a lower alkyl radical.

The compound of the Formula IV obtained in the first step is then reacted (i) with a primary amine selected from ammonia, guanidine, hydrazine, methylamine, ethylamine, ethanolamine, propylamine, isopropylamine, allylamine, n-butylamine, isobutylamine, amylamine, isoamylamine, hexylamine, benzylamine, and phenethylamine, or (ii) with an heterocyclic amine, such as morpholine, pyrrolidine, piperidine, piperazine or a substituted piperazine, in methanol as solvent, preferably under reflux, so as to obtain a compound of Formula I.

A compound of the Formula I may also be obtained by reaction of a compound of the Formula III with dimethylamine. With secondary amines other than dimethylamine, it has not been possible to obtain compounds of Formula I.

Compounds of the Formula I may also be obtained by reacting a compound of the Formula III with a heterocyclic amine different from morpholine, for example with pyrrolidine, piperidine, piperazine or a substituted piperazine, in methanol used as solvent.

Compounds of Formula II, they can be prepared (1) by reacting a compound of the Formula III with morpholine, in methanol or (2) by reacting a compound of the Formula III with a heterocyclic amine, such as piperidine, morpholine and hexamethyleimine, in tetrahydrofuran, preferably under reflux.

When a compound of the Formula III is reacted in methanol with pyrrolidine, piperidine or a substituted piperazine, mixtures of compounds of the Formulae I and II are sometimes obtained.

The compounds of the Formula IV are also new compounds in the scope of this invention. Among these compounds, the following may be cited:

3-methoxy-2H-fluoreno-[1,9-ef]-1,4-diazepine-1-oxide,
3-ethoxy-2H-fluoreno-[1,9-ef]-1,4-diazepine-1-oxide,
7-chloro-3-methoxy-2H-fluoreno-[1,9-ef]-1,4-diazepine-1-oxide, 5-chloro-3-methoxy-2H-fluoreno-[1,9-ef]-1,4-diazepine-1-oxide.

The new compounds of the Formula III may be obtained by cyclization by means of sulphuric acid or by means of phosphoric anhydride in solvents, such as benzene, toluene or xylene, of 1-acylaminofluorenone-oximes of the following formula:

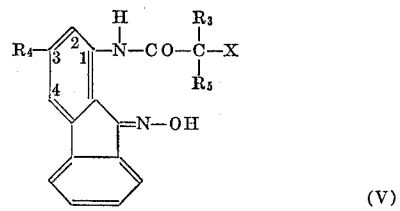

(V)

in which $R_3$, $R_4$, $R_5$ and X have the above meaning.

This reaction may be represented as follows:

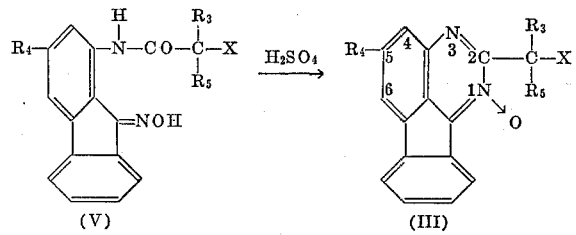

(V)          (III)

The compounds of Formula V are also new compounds, the following being illustrative thereof:

1-(chloroacetyl)aminofluorenone-oxime,
1-(bromoacetyl)aminofluorenone-oxime,
1-(α-chloropropionyl)aminofluorenone-oxime,
1-(chloroacetyl)amino-4-chlorofluorenone-oxime,
1-(α-chloropropionyl)amino-4-chlorofluorenone-oxime,
1-(α-bromoisobutyryl)aminofluorenone-oxime,
1-(chloroacetyl)amino-2-chlorofluorenone-oxime,
1-(α-chloropropionyl)amino-2-chlorofluorenone-oxime.

The compounds of Formula V may be obtained by reacting hydroxylamine hydrochloride ($NH_2OH \cdot HCl$) on new compounds, i.e. 1-acylaminofluorenones of Formula V. This reaction may be represented as follows:

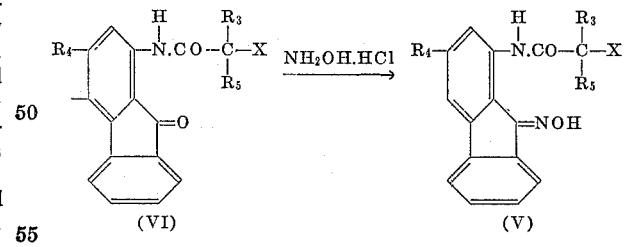

(VI)          (V)

This reaction may, for example, be carried out in an alcohol in the presence of pyridine.

Examples of the Formula VI are:

1-(chloroacetyl)aminofluorenone,
1-(α-chloropropionyl)aminofluorenone,
1-(α-bromoisobutyryl)aminofluorenone,
1-(chloroacetyl)amino-4-chlorofluorenone,
1-(α-chloropropionyl)amino-4-chlorofluorenone,
1-(chloroacetyl)amino-2-chlorofluorenone,
1-(α-chloropropionyl)amino-2-chlorofluorenone.

The compounds of Formula V may also possibly be obtained by reacting a halide of the formula:

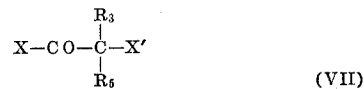

(VII)

in which X and X′, which may be identical or different, represent a halogen, such as chlorine or bromine, and $R_3$ as well $R_5$ have the above described meaning, with a 1-amino-fluorenone oxime of the following formula:

$$\text{(VIII)}$$

in which $R_4$ has the above described meaning.

The compounds of Formula VIII are also new compounds in the scope of the invention. These compounds are:

1-aminofluorenone oxime,
1-amino-2-chloro-fluorenone oxime,
1-amino-4-chloro-fluorenone oxime.

The new compounds of Formula VIII may be obtained by reaction of hydroxylamine hydrochloride ($NH_2OH.HCl$) with an aminofluorenone of the Formula IX as follows:

$$\text{(IX)} \quad \text{(VIII)}$$

In these formulae, $R_4$ represents a halogen such as chlorine or bromine.

The aminofluorenones of Formula IX are:

1-aminofluorenone,
2-chloro-1-aminofluorenone,
4-chloro-1-aminofluorenone.

Said compounds of Formula IX may also be used for obtaining the compounds of Formula VI by reaction with halides of the Formula VII. This reaction may be represented as follows:

$$\text{(IX)} \quad \text{(VII)} \quad \text{(VI)}$$

The 1-aminofluorenone is a known compound, but the 2-chloro-1-aminofluorenone and 4-chloro-1-aminofluorenone are new and may be prepared by chlorination of 1-aminofluorenone in several ways. For example, the chlorination may be carried out in chloroform in the presence of pyridine at a temperature comprised between 0° C. and 20° C. A mixture of 2-chloro-1-aminofluorenone and 4-chloro-1-aminofluorenone is obtained. These two compounds may be separated by chromatography or by fractionated crystallization.

The preparation of the various new compounds of Formulae I, II, III, IV, V, VI, VII, VIII and IX according to this invention will now be described in the following examples:

EXAMPLE 1

Preparation of 2-chloro-1-aminofluorenone and 4-chloro-1-aminofluorenone 20 g. of 1-aminofluorenone dissolved in 300 ml. of anhydrous chloroform and 40 ml. of dry pyridine are placed in a three-necked vessel provided with a stirrer and with an inlet and outlet of chlorine.

The stoichiometric quantity of chlorine is then bubbled into the mixture and, after the addition of said chlorine, the mixture is stirred during 30 minutes. Water is then added and the chloroform layer is separated and dried. The chloroform is then removed under vacuum. The residual oil is dissolved in benzene and chromatographed on a column of basic alumina. By eluation with benzene, a first orange band is separated and concentrated under vacuum, so as to obtain a solid residue which is recrystallized from ethanol.

6.4 g. of 1-amino-2-chlorofluorenone melting at 164–165° C. are obtained; by elution with a mixture of benzene and chloroform and by recrystallization from a mixture of benzene and petroleum ether, one obtains 13.5 g. of 1-amino-4-chlorofluorenone melting at 183.5–184° C. The total yield is of 85%, in the proportion of 1 part of 2-chloro-1-aminofluorenone for 2 parts of 4-chloro-1-aminofluorenone.

EXAMPLE 2

Preparation of 1-aminofluorenone-oxime

A mixture of 1 g. of 1-aminofluorenone, 2.8 g. of hydroxylamine hydrochloride, 8 ml. of pyridine and 24 ml. of absolute ethanol is refluxed during 2.25 hours. The solution is then concentrated to dryness in vacuo and the residue is extracted with water. The precipitate is filtered, dried and recrystallized from a mixture of methanol and water and from benzene. Fine yellow needles melting at 209–210° C. (dec.) are obtained.

t is possible to prepare the hydrochloride of this compound by dissolving it in warm ethanol and adding a saturated solution of hydrochloric acid in alcohol. The hydrochloride precipitates and is filtered after cooling of the suspension. This hydrochloride may be purified by recrystallizing from ethanol containing a small amount of hydrochloric acid. Fine white needles melting at 242–244° C. with decomposition are obtained.

EXAMPLE 3

Preparation of 1-amino-4-chlorofluorenone-oxime

A mixture of 5 g. of 1-amino-4-chlorofluorenone, 5 g. of hydroxylamine hydrochloride, 75 ml. of anhydrous pyridine and 75 ml. of anhydrous ethanol is refluxed during 24 hours.

The major part of the solvent is then removed and the suspension is poured on ice. The obtained precipitate is filtered and washed with water. 5.3 g. of a product melting at 240–241° C. after recrysatllization from a mixture of ethanol and water are obtained. Yield: 99%.

EXAMPLE 4

Preparation of 1-(chloroacetyl)aminofluorenone 1.95 g. of 1-aminofluorenone are dissolved in 45 ml. of dry ether to which 0.9 ml. of anhydrous pyridine have been added. 1 ml. of chloroacetic acid chloride is added to said solution. The mixture is stirred during 2 hours, whereafter water is added and the suspension is filtered. The ether solution is decanted, dried and concentrated to dryness. The residue is added to the filtered product. The combined products are then recrystallized from methanol containing a small amount of acetone. After a few recrystallizations from methanol, the product melts at 162–163° C.; yellow needles.

EXAMPLE 5

Preparation of 1-(α-chloropropionyl)aminofluorenone

To a mixture of 0.5 g. of 1-aminofluorenone, 0.2 ml. of anhydrous pyridine and 11 ml. of anhydrous ether, 3.2 g. of α-chloropropionic acid chloride are added, while stirring. The mixture is then stirred during 2 hours, a small amount of water is then added and the reaction product is extracted with chloroform and chloroform solution is washed, dried and concentrated to dryness. The residue is recrystallized from ethanol. Yellow crystals melting at 107–109° C. are obtained. The yield of the reaction is practically quantitative.

EXAMPLE 6

Preparation of 1-(α-bromoisobutyryl)aminofluorenone 0.48 g. of α-bromoisobutyric acid bromide are added dropwise and with stirring and cooling to a solution of 0.36 g. of 1-aminofluorenone in 10 ml. of anhydrous ether containing 0.166 g. of anhydrous pyridine. The reaction mixture containing a yellow precipitate is stirred during 30 minutes. After addition of water, the reaction mixture is extracted with chloroform.

The chloroform extract is then washed, dried and evaporated to dryness. The residue is recrystallized from ethanol. Yellow crystals melting at 155–156° C. are obtained.

EXAMPLE 7

Preparation of 1-(chloroacetyl)-amino-4-chlorofluorenone 4.5 g. (0.02 m.) of 1-amino-4-chlorofluorenone, 1.8 ml. (0.023 m.) of anhydrous pyridine and 100 ml. of anhydrous ether are placed in a three-necked vessel of a capacity of 250 ml., equipped with a stirrer, a condenser and a dropping funnel. 1.8 ml. of chloroacetic acid chloride are then added drop by drop. When the addition of the chloride is completed, the mixture is stirred during 2 hours. After the addition of water, the ether is removed and the precipitate is filtered. A solid (4.80 g.) melting at 189–190° C. after recrystallization in acetone is obtained.

In a second test, 4.5 g. of 1-amino-4-chlorofluorenone (0.02 mole) suspended in 100 cc. of anhydrous ether are placed in a three-necked vessel. 1.8 g. of choloroacetic pyridine (0.023 mole) are added and 1.8 g. of chloracetic acid chloride dissolved in 25 ml. of anhydrous ether (0.023 mole) are then poured into the suspension. This pouring is effected within 15 minutes and the mixture is then stirred during 2 hours. The suspension is treated with water and the reaction product is extracted by means of chloroform. The chloroform solution is washed, dried and concentrated by dryness under vacuum. The residue is recrystallized from benzene. 5.65 g. of 1-(chloroacetyl) amino-4-chlorofluorenone are obtained; yield: 95%.

EXAMPLE 8

Preparation of 1-(α-chloropropionyl)amino-4-chlorofluorenone

In a vessel of a capacity of 250 ml. equipped with a stirrer, a condenser and a dropping funnel, 4.5 g. (0.02 mole) of 1-amino-4-chlorofluorenone, 1.8 ml. (0.023 mole) of anhydrous pyridine and 100 ml. of anhydrous ether are introduced. 2.25 ml. α-chloropropionic acid chloride are then added drop by drop. When the addition is completed, the mixture is still stirred during 2 hours, whereafter water is added and the ether is removed under vacuum. The obtained precipitate (5.25 g.) is filtered and recrystallized from ethanol. Melting point: 130–131° C. Yellow microcrystals are obtained. Yield: 88%.

EXAMPLE 9

Preparation of 1-(chloroacetyl)amino-2-chlorofluorenone

In a three-necked vessel equipped with a stirrer, a condenser and a dropping funnel, 10.35 g. of 1-amino-2-chlorofluorenone (0.045 mole) dissolved in 400 ml. of anhydrous toluene are placed. After adding 4 ml. of dry pyridine, the mixture is refluxed and 5.59 g. of chloroacetic acid chloride (0.05 mole) dissolved in 50 ml. of anhydrous toluene are added rapidly drop by drop, the heating to reflux being then continued during 17 hours. The mixture is then cooled and water is then added thereto. The obtained suspension is filtered. 10 g. of a yellowish product melting at about 246–248° C. are obtained. The filtrate is extracted and the product obtained is recrystallized, so that a further fraction of 0.35 g. of the product is obtained. The total yield amounts to 75.5%.

After several crystallizations from benzene, the purified sample consists in yellow microcrystals melting at 246.5–247° C.

EXAMPLE 10

Preparation of 1-(α-chloropropionyl)amino-2-chlorofluorenone

A mixture of 1.15 g. of 1-amino-2-chlorofluorenone, 50 ml. of anhydrous toluene and 0.45 ml. of dry pyridine is refluxed and 0.7 g. of α-chloropropionic acid chloride dissolved in 10 cc. of anhydrous toluene are then added to the said mixture, which is further refluxed during 4.5 hours. The mixture is then cooled and treated with water. The obtained suspension is filtered and the collected solid (0.6 g.) is purified by crystallization from ethanol. Yellow crystals melting at 209–210° C. are obtained.

The filtrate is extracted with chloroform and the chloroform solution is washed, dried and concentrated to dryness. The residue is recrystallized from ethanol. The total amount is of 90%.

EXAMPLE 11

Preparation of 1-(chloroacetyl)aminofluorenone-oxime from 1-aminofluorenone-oxime 0.95 g. of the oxime of 1-aminofluorenone are dissolved in 7.5 ml. of pure dioxane. To this solution are added 0.5 ml. of chloroacetic acid chloride and 2.9 ml. of 3 N NaOH, said products being added at such a speed that the pH remains neutral or slightly alkaline. The reaction takes place at a temperature of less than 15° C. The reaction mixture is stirred during 30 minutes after the addition of the reagents has been completed. The heavy precipitate is filtered, dried and recrystallized from methanol. The product obtained has a cream colour and melts at 210–212° C. (dec.).

EXAMPLE 12

Preparation of 1-(chloroacetyl)amino fluorenone-oxime from 1-(chloroacetyl)amino fluorenone A mixture of 1 g. of 1-(chloroacetyl)amino fluorenone, 1 g. of hydroxylamine hydrochloride, 1 ml. of pyridine and 10 ml. of ethanol is refluxed during 2 hours. The suspension is then concentrated and the residue is suspended in water, the suspension being then filtered. The product is dried and recrystallized from methanol. Melting point 208–209° C. The yield of the reaction is substantially quantitative.

EXAMPLE 13

Preparation of 1-bromoacetylaminofluorenone-oxime 2.05 g. of 1-aminofluorenone are dissolved into 20 ml. of dioxane. To the cooled solution (10–15° C.) are added drop by drop 2.2 g. of bromoacetyl bromide and 3 N sodium hydroxide so that the pH remains neutral or slightly alkaline. After stirring during 30 minutes, the reaction solution is poured on ice and the obtained precipitate is filtered and recrystallized from benzene containing a small quantity of methanol. M.P.: 168–170° C. (dec.).

EXAMPLE 14

Preparation of 1-(α-chloropropionyl)aminofluorenone-oxime

A mixture of 0.5 g. of 1-(α-chloropropionyl)aminofluorenone, 0.5 g. of hydroxylamine hydrochloride, 0.5 ml. of pyridine and 10 ml. of ethanol is refluxed during 2 hours. The solution is then concentrated to dryness and the residue is treated with water and filtered. The filtered product is purified by crystallization from benzene and from a mixture of benzene and petroleum ether. The obtained product melts at 188–190° C. (dec.). The yield is substantially quantitative.

EXAMPLE 15

Preparation of 1-(α-chloropropionyl)aminofluorenone-oxime

To a solution of 0.5 g. of 1-aminofluorenone-oxime in 15 ml. of dioxane are alternatively added 0.32 g. of α-chloropropionic acid chloride and an excess of 3 N sodium hydroxide. The mixture is stirred and the temperature is maintained at less than 15° C. during the addition of said product, the addition of sodium hydroxide being adjusted so as to maintain the pH between 5 and 7. At the end of the reaction, the pH is adjusted at about 6–7. The mixture is then stirred during 30 minutes and poured on ice. The obtained precipitate is filtered and recrystallized several times from benzene. The final product melts at 192–193.5° C. with decomposition. The yield of the reaction is practically quantitative.

EXAMPLE 16

Preparation of 1-(chloroacetyl)amino-4-chloro-fluorenone-oxime 18.7 g. (0.077 mole) of 1-amino-chlorofluorenone-oxime and 500 ml. of pure dioxane are placed in a vessel of 2 liters equipped with a stirrer and a thermometer.

7.4 ml. of chloroacetic acid chloride and 3 N NaOH are then added drop by drop, so as to maintain the temperature at less than 15° and the pH between 5 and 7. When the addition is completed, the mixture is stirred during 30 minutes at room temperature. The reaction mixture is then cooled by means of ice and salt and the precipitate is filtered. Ice is added to the filtrate, so that a new precipitate is obtained, which is collected and added to the first one. 24.2 g. of a product melting at 216.5–217° C. after a recrystallization from a mixture of ethanol and water are obtained, as yellowish microcrystals. Yield: 98%.

The same compound may be obtained as follows:

A mixture of 1.3 g. of 1-(chloroacetyl)amino-4-chlorofluorenone melting at 185.5–188° C., 1.3 g. of hydroxylamine hydrochloride, 1.45 g. of pyridine and 200 ml. of alcohol is refluxed during 46.5 hours. The solution is then concentrated and diluted with water. The obtained precipitate is filtered and recrystallized from a mixture of benzene and ethanol. A product melting with decomposition at 220–221° C. is obtained.

EXAMPLE 17

Preparation of 1-(α-bromoisobutyryl)amino-fluorenone-oxime

A mixture of 0.5 g. of 1-(α-bromoisobutyryl)aminofluorenone, 0.5 g. of hydroxylamine hydrochloride, 0.5 g. of anhydrous pyridine and 15 ml. of absolute ethanol is refluxed during 3 hours. After evaporation to dryness, the residue is treated with water, filtered. washed and dried. After recrystallizations from benzene, yellow crystals melting at 167–169° C. are obtained with a yield of 82%.

The same compound melting at 175–175.5° C. has been prepared from α-bromoisobutyryl bromide and 1-aminofluorenone oxime in the presence of dioxane and 3 N sodium hydroxide.

EXAMPLE 18

Preparation of 1-(α-chloropropionyl)amino-4-chlorofluorenone-oxime

In a three-necked vessel of a capacity of 50 ml. equipped with a stirrer, a thermometer and a dropping funnel, 1 g. (0.0041 mole) of 1-amino-4-chlorofluorenone-oxime and 20 ml. of pure dioxane are placed. Then, 0.45 ml. of α-chloropropionic acid chloride and sodium hydroxide (3 N solution) are simultaneously added drop by drop, so as to maintain the pH between 5 and 7 and the temperature at less than 15° C. When the addition is finished, the mixture is further stirred during 30 minutes at room temperature. The mixture is then cooled by means of an ice and salt bath. The precipitate is filtered and ice is added to the filtrate, so that a new precipitate appears. This new precipitate is combined with the precipitate obtained after cooling of the reaction mixture. One obtains 1.22 g. of a product which, after recrystallization from a mixture of ethanol and water, melts at 225.5–226° C. (yellow microcrystals). Yield: 90%.

The same compound has also obtained as follows:

2 g. of 1-(α-chloropropionyl)amino-4-chlorofluorenone, 2 g. of hydroxylamine hydrochloride, 2.4 g. of pyridine and 300 ml. of ethanol are refluxed during 25 hours. The solution is then concentrated to dryness and the residue treated by water and filtered. The product is then recrystallized from a mixture of alcohol and benzene. The yellowish product melts at 216–219° C.

EXAMPLE 19

Preparation of 1-(chloroacetyl)amino-2-chloro-fluorenone-oxime

A mixture of 0.2 g. of 1-(chloroacetyl)amino-2-chlorofluorenone, 0.2 g. of hydroxylamine hydrochloride, 0.24 ml. of pyridine and 50 ml. of ethanol is refluxed during 17 hours. The obtained solution is then concentrated to dryness and the residue is extracted with water and filtered. The filtered product is recrystallized from a mixture of benzene and methanol. Microcrystals melting with decomposition at 208–209° C. are obtained.

EXAMPLE 20

Preparation of 1-(α-chloropropionyl)amino-2-chloro-fluorenone-oxime

A mixture of 0.7 g. of 1-(α-chloropropionyl)amino-2-chlorofluorenone, 0.7 g. of hydroxylamine hydrochloride, 0.8 g. of anhydrous pyridine and 150 ml. of ethanol is refluxed during 18 hours and the obtained solution is concentrated to dryness. The residue is treated with water, filtered, dried and recrystallized from benzene. White crystals melting with decomposition at 206–206.5° C. are obtained.

EXAMPLE 21

Preparation of 3-methoxy-2H-fluoreno-[1,9-ef]-1,4-diazepine-1-oxide

A mixture of 0.5 g. of 2-chloromethyl-1,3-diazafluoranthene-1-oxide, 4 ml. of diethylamine and 20 ml. of methanol is stirred during 64 hours. The solution is then concentrated to dryness and the residue treated with water. The precipitate is filtered, dried and recrystallized from a mixture of methanol and water. Yellow orange crystals melting at 152–153° C. are obtained.

The same compound may be obtained when sec.-butylamine, tert.-butylamine, cyclohexylamine, piperazine or preferably triethylamine are used in place of diethylamine.

EXAMPLE 22

Preparation of 3-methoxy-2H-fluoreno-[1,9-ef]-1,4-diazepine-1-oxide

A mixture of 0.5 g. of 2-chloromethyl-1,3-diazafluoranthene-1-oxide, 2 cc. of N-ethylethanolamine and 20 ml. of methanol is stirred during 64 hours. The solution is then concentrated to dryness and the residue treated with water. The solid is filtered, dried and recrystallized from methanol. The product melts at about 155° C.

EXAMPLE 23

Preparation of 3-ethoxy-2H-fluoreno-[1,9-ef]-1,4-diazepine-1-oxide

A mixture of 0.5 g. of 2-chloromethyl-1,3-diazafluoranthene-1-oxide and 15 ml. of a solution of 33% diethylamine in ethanol is stirred during 20 hours. The solution is then diluted with water and extracted by means of chloroform. The chloroform fraction is washed with very diluted acid and with water. Finally, the solution is dried and concentrated to dryness. The residue is purified by recrystallization from cyclohexane. The obtained product melts at 171–173° C.

EXAMPLE 24

Preparation of 7-chloro-3-methoxy-2H-fluoreno-[1,9-ef]-1,4-diazepine-1-oxide 600 mg. (0.002 mole) of 6-chloro-2-chloromethyl-1,3-diazafluoranthene-1-oxide are stirred during 16 hours in the presence of 5 ml. of isopropylamine and 10 ml. of anhydrous methanol. One obtains 500 mg. of a product which melts at 199–200° C., after recrystallization from a mixture of benzene and cyclohexane. Yield: 78%.

The same product may be obtained, in the same conditions, by reacting 6-chloro-2-chloromethyl-1,3-diazafluoranthene-1-oxide with diethylamine, triethylamine, ethanolamine, cyclohexylamine, N-methylpiperazine, β-hydroxylethylpiperazine, hexamethyleneimine and isopropylamine, in methanol.

EXAMPLE 25

Preparation of 2-chloromethyl-1,3-diazafluoranthene-1-oxide

1st method: Cyclization by means of phosphorus pentoxide.—A solution of 1 g. of 1-(α-chloroacetyl)aminofluorenoneoxime in 60 ml. of xylene is refluxed with stirring. An excess of phosphorus pentoxide is added from time to time in small fractions. After having refluxed the mixture during 30 minutes, said mixture is cooled with ice, whereas ice is introduced in the reaction vessel in order to destroy this excess of phosphorus pentoxide. The reaction mixture is then neutralized by means of sodium bicarbonate. The xylene phase is separated and filtered. The filtrate is washed, dried and concentrated. The residue is recrystallized from a mixture of benzene and petroleum ether. Yellow crystals melting at 187–190° C. with decomposition are obtained. Yield: about 50%.

2nd method: Cyclization by means of sulphuric acid.—The same compound may be obtained, when concentrated sulphuric acid is used instead of phosphorus pentoxide as cyclization agent. The yield of the reaction is quantitative. The product may be purified by recrystallization from acetone and melts then at 204–206° C., but it is exactly the same as the product obtained by the first method.

EXAMPLE 26

Preparation of 2-(α-chloroethyl)-1,3-diazafluoranthene-1-oxide

A suspension of 0.25 g. of 1-(α-chloropropionyl)aminofluorenone-oxime (M.P.: 188–190° C.) in 6 ml. of concentrated sulphuric acid is stirred during 2 hours in the absence of moisture. The mixture is then poured on ice and the obtained precipitate is filtered. The filtered product is dried and recrystallized from anhydrous benzene. After a few recrystallizations from a mixture of benzene and petroleum ether, one obtains a product melting at 166–169° C. (dec.).

EXAMPLE 27

Preparation of 2-(α-chloroethyl)-1,3-diazafluoranthene-1-oxide

A mixture of 0.3 g. of 1-(α-chloropropionyl)aminofluorenone oximine (M.P. 192–193.5° C). and of 10 ml. concentrated sulphuric acid is stirred during 4 hours. The obtained solution is then poured on an excess of ice, while stirring and the obtained precipitate is filtered, dried and recrystallized from a mixture of benzene and petroleum ether. After filtration, the product is again recrystallized from cyclohexane containing a small amount of chloroform. The yellow product is recrystallized again from cyclohexane containing chloroform and the obtained product melts at 180.5–181.5° C. with decomposition and it is exactly the same as the product obtained in the Example 24. The yield of the cyclisation is substantially quantitative.

EXAMPLE 28

Preparation of 2-bromomethyl-1,3-diazafluoranthene-1-oxide 0.5 g. of 1-bromoacetylaminofluorenone-oxime are stirred during 2.2 hours in 15 ml. of sulphuric acid. The solution is then poured on ice and the yellow precipitate is filtered. After several recrystallizations from acetone, small yellow needles melting at 195–196° C. (dec.) are obtained.

EXAMPLE 29

Preparation of 2-(α-bromoisopropyl)-1,3-diazafluoranthene-1-oxide 0.5 g. of 1-(α-bromoisopropyl)-aminofluorenone-oxime are poured into 15 ml. of concentrated sulphuric acid. The solution is stirred during several hours and is then poured on ice. The obtained precipitate is filtered, washed and dried. After recrystallizations from acetone, yellow crystals melting at 150–151° C. are obtained.

EXAMPLE 30

Preparation of 6-chloro-2-chloromethyl-1,3-diazafluoranthene-1-oxide

In a vessel of a capacity of 500 ml. equipped with a stirrer, 19 g. (0.06 m.) of 1-(chloroacetyl)amino-4-chlorofluorenone-oxime and 190 ml. of concentrated sulphuric acid are introduced, in the absence of moisture. The mixture is stirred during 4 hours at room temperature and then poured on ice. The obtained precipitate is filtered and washed with water until the filtrate is neutral. The product is finally dried under vacuum. 17.2 g. of a product melting at 203–204.5° C., after recrystallization from a mixture of benzene and petroleum ether are obtained. Yield: 97%.

EXAMPLE 31

Preparation of 6-chloro-2-(α-chloroethyl)-1,3-diazafluoranthene-1-oxide 500 mg. (0.0014 mole) of 1-(α-chloropropionyl)amino-4-chlorofluorenone-oxime and 10 ml. of concentrated sulphuric acid are placed in a vessel of a capacity of 50 ml. provided with a stirrer, under conditions avoiding the introduction of moisture in the vessel. The mixture is then agitated during 4 hours at room temperature and poured on ice. The obtained precipitate is filtered and washed until the pH of the washing liquid is neutral. The obtained product is dried under vacuum. 400 mg. of a product melting at 211.5–212° C., after recrystallization from carbon tetrachloride are obtained. Yield: 85%.

EXAMPLE 32

Preparation of 4-chloro-2-chloromethyl-1,3-diazafluoranthene-1-oxide

In a three-necked vessel equipped with a stirrer, a thermometer and a tube containing a drying substance, 75 ml. of concentrated sulphuric acid are placed. To said acid, 6.4 g. of 1-(chloroacetyl)amino-2-chlorofluorenone-oxime under the form of fine powder are added. The solution is stirred at room temperature during 4 hours.

The solution is then poured on a great excess of ice while stirring. The yellow precipitate is rapidly filtered, washed and dried. The product is then recrystallized from a mixture (80/100) of benzene and petroleum ether. 5 g. of yellow needles melting at 222–223° C. with decomposition are obtained. A sample is purified by recrystallization from benzene and melts at 229–230° C. Yield: 83%.

EXAMPLE 33

Preparation of 4-chloro-2-(α-chloroethyl)-1,3-diazafluoranthene-1-oxide 0.4 g. of 1-(α-chloropropionyl)amino-2-chlorofluorenone-oxime in 15 ml. of pure sulphuric acid are stirred during 4 hours at room temperature. The solution is then poured on ice, while being stirred and the yellow precipitate is filtered, washed, dried and crystallized from benzene. Fine yellow crystals melting at 223.5–224° C. with decomposition are obtained.

EXAMPLE 34

Preparation of 2-piperidinomethyl-1,3-diazafluoranthene-1-oxide and the hydrochloride thereof A mixture of 0.54 g. of 2-chloromethyl-1,3-diazafluoranthene-1-oxide, of 25 ml. of tetrahydrofuran and of 0.4 ml. of piperidine is refluxed during 30 minutes. The suspension is then poured on ice and the precipitate is filtered, washed, dried and recrystallized from cyclohexane. M.P. 155–157° C.

The hydrochloride is prepared by adding a 2 N solution of HCl in ethanol to a solution of the base in chloroform. M.P. 192–194° C. (decomposition) after recrystallization from ethanol.

EXAMPLE 35

Preparation of 2-hexamethyleneiminomethyl-1,3-diazafluoranthene-1-oxide

A mixture of 0.54 g. of 2-chloromethyl-1,3-diazafluoranthene-1-oxide, of 30 ml. of tetrahydrofuran and of 0.45 ml. of hexamethyleneimine is refluxed during 30 minutes. The suspension is poured on ice and the obtained precipitate is filtered, washed and dried. Yellow microcrystals melting at 146–148° C. after several recrystallizations from cyclohexane are obtained.

EXAMPLE 36

Preparation of 2-morpholinomethyl-1,3-diazafluoranthene-1-oxide and the hydrochloride thereof A mixture of 0.5 g. of 2-chloromethyl-1,3-diazafluoranthene-1-oxide, 2 ml. of morpholine and 20 ml. of methanol is stirred during 64 hours at room temperature, or refluxed in 35 ml. tetrahydrofuran during 1 hour. The solution is then concentrated to dryness and the residue is treated with water and filtered. The obtained product is recrystallized from methanol and melts at 168–170° C. (orange crystals).

The hydrochloride is prepared by dissolving the base in methanol and adding a solution of ethanol and hydrochloric acid, until the pH reaches 3.5–4. The mixture is then concentrated to dryness and recrystallized from a mixture of methanol and methylethylketone. The product melts at 199–201° C., with decomposition. The microcrystals have a yellow-orange colour and are soluble in water.

EXAMPLE 37

Preparation of 4-chloro-2-morpholinomethyl-1,3-diazafluoranthene-1-oxide and the hydrochloride thereof A mixture of 0.5 g. of 4-chloro-2-chloromethyl-1,3-diazafluoranthene-1-oxide, 2 ml. of morpholine and 20 ml. of methanol is stirred during 138 hours and the obtained solution is poured on ice. The obtained precipitate is filtered and purified by several crystallizations from a mixture of benzene and petroleum ether. Yellow orange crystals melting at 172–174° C. are obtained.

The same product may be obtained by reacting 0.6 g. of 4-chloro-2-chloromethyl-1,3-diazafluoranthene-1-oxide with 0.35 ml. of morpholine in 35 ml. of tetrahydrofuran. The mixture is refluxed and stirred during 2 hours.

The hydrochloride of the product is prepared by dissolving the base in chloroform and by treating the solution with a stoichiometric amount of a 2 N solution of hydrochloric acid in ethanol. The hydrochloride precipitates and, after recrystallization from methanol, microcrystals of yellow colour melting at 223–225° C. (dec.) are obtained.

EXAMPLE 38

Preparation of 7-chloro-2-morpholinomethyl-1,3-diazafluoranthene-1-oxide and the hydrochloride thereof 600 mg. (0.002 mole) of 6-chloro-2-chloromethyl-1,3-diazofluoranthene-1-oxide are stirred during 70 hours in the presence of 2 ml. of morpholine in 20 ml. of anhydrous methanol. The product is isolated by the usual method and purified by crystallization from a mixture of benzene and petroleum ether. Yellow orange needles melting at 169–170° C. are obtained. Yield: 91%.

The hydrochloride is prepared by the usual method and melts at 217–218° C. (dec.) after recrystallization from a mixture of methanol and ether. (Yellow microcrystals.)

EXAMPLE 39

Preparation of the 3-amino-2H-fluoreno-[1,9-ef]-1,4-diazepine-1-oxide

A mixture of 0.52 g. of 3-methoxy-2H-fluoreno-[1,9-ef]-1,4-diazepine-1-oxide, of 25 ml. of a saturated solution of ammonia in methanol and of 50 ml. of methanol is refluxed during 24 hours. The suspension is then poured on ice and the obtained precipitate is filtered, washed, dried and recrystallized from methyl ethyl ketone. The yellow microcrystals melt at more than 400° C.

The same product has been obtained by reaction of ammonia with 2-chloromethyl-1,3-diazafluoranthene-1-oxide.

EXAMPLE 40

Preparation of 3-dimethylamino-2H-fluoreno-[1,9-ef]-1,4-diazepine-1-oxide and the hydrochloride thereof A mixture of 0.5 g. of 2-chloromethyl-1,3-diazafluoranthene-1-oxide and 15 ml. of 30% solution of dimethylamine in ethanol is stirred at room temperature during 16 hours. The solution is then concentrated and the residue is recrystallized from methanol. The obtained yellow needles melt at 214–216° C. with decomposition.

The hydrochloride prepared by the usual method and recrystallized from a mixture of methanol and methylethylketone melts at 199–201° C. (dec.).

EXAMPLE 41

Preparation of 3-methylamino-2H-fluoreno-[1,9-ef]-1,4-diazepine-1-oxide and the hydrochloride thereof 0.5 g. of 2-chloromethyl-1,3-diazafluoranthene-1-oxide and 15 ml. of a solution of 30% of methylamine in alcohol are stirred at room temperature during 68 hours. The solution is then concentrated to dryness and the residue is stirred with a small amount of water. The aqueous solution is filtered and the yellow product is recrystallized from methanol. The yellow crystals melt at 219–221° C. (dec.). The yield is quantitative. The same compound may be obtained from 2-bromomethyl-1,3-diazafluoranthene-1-oxide and methylamine.

The hydrochloride of said compound is prepared by dissolving the amine into a small quantity of methanol and by adding drop by drop a saturated alcoholic solution of gaseous hydrochloric acid, until the pH reaches 2.5–3. The obtained mixture is concentrated at a low temperature and the residue is recrystallized from a mixture of methanol and methylethylketone. Yellow microcrystals melting at about 230° C. (dec.) are obtained. The same product may be obtained, starting from 2-bromo-methyl-1,3-diazafluoranthene-1-oxide and methylamine.

EXAMPLE 42

Preparation of 3-methylamino-2H-2,2-dimethyl-fluoreno-[1,9-ef]-1,4-diazepine-1-oxide A mixture of 0.5 g. of 2-(α-bromoisopropyl)-1,3-diazafluoranthene-1-oxide, of 15 ml. of a solution of 30% methylamine in ethanol and of 50 ml. of methanol is refluxed during several hours. The solution is then poured on ice and the precipitate is filtered, washed, dried and recrystallized from cyclohexane. M.P.: 172–174° C.

EXAMPLE 43

Preparation of 3-ethylamino-2H-fluoreno-[1,9-ef]-1,4-diazepine and the hydrochloride thereof A mixture of 2 g. of 2-chloromethyl-1,3-diazafluoranthene-1-oxide and 60 ml. of a solution of 20% of ethylamine in methanol is stirred during 21 hours at room temperature. The reaction mixture is then concentrated to dryness and the residue extracted with water. After filtering, the product is recrystallized from methanol and then from a mixture of benzene and petroleum ether. Yellow microcrystals melting at 212–214° C. are obtained. Yield: about 90%.

The hydrochloride of this product is prepared by dissolving 0.5 g. of this product in chloroform and by adding a saturated solution of hydrochloric acid in alcohol. The hydrochloride precipitates and is filtered and washed with chloroform. The yield is quantitative and the product is purified by recrystallization from a mixture of methanol and methylethylketone. The crystals melt at 215–220° C. (dec.).

EXAMPLE 44

Preparation of 3-propylamino-2H-fluoreno-[1,9-ef]-1,4-diazepine-1-oxide and the hydrochloride thereof A mixture of 0.5 g. of 2-chloromethyl-1,3-diazafluoranthene-1-oxide, 5 ml. of propylamine and 5 ml. of methanol is stirred during 16 hours at room temperature. The mixture is then concentrated to dryness and the residue is directly recrystallized from methanol. Fine needles melting at 214–216° C. (dec.) are obtained.

The hydrochloride is prepared by the usual method and is recrystallized from a mixture of methanol-methylethylketone. This hydrochloride melts at 215–220° C. (dec.).

EXAMPLE 45

Preparation of 3-isopropylamino-2H-[1,9-ef]-1,4-diazepine-1-oxide

A mixture of 0.5 g. of 2-chloromethyl-1,3-diazafluoranthene-1-oxide, 5 ml. of isopropylamine and 5 ml. of methanol is stirred at a room temperature during 16 hours. The obtained solution is concentrated to dryness and the product is directly recrystallized from methanol. Yellow crystals melting at 210–211° C. (dec.) are obtained.

The same product may be obtained by stirring during 94 hours a mixture of 0.5 g. of 3-methoxy-2H-fluoreno-[1,9-ef]-1,4-diazepine-1-oxide, of 25 ml. of anhydrous methanol and of 5 ml. of isopropylamine.

EXAMPLE 46

Preparation of 3-sec.-butylamino-2H-fluoreno-[1,9-ef]-1,4-diazepine-1-oxide

This compound is prepared as described in Example 42 by refluxing 0.52 g. of 3-methoxy-2H-fluoreno-[1,9-ef]-1,4-diazepine-1-oxide, 2 ml. of sec.-butylamine and 50 ml. of methanol. M.P.: 204.5–205° C.

EXAMPLE 47

Preparation of 3-n-butylamino-2H-fluoreno-[1,9-ef]-1,4-diazepine-1-oxide and the hydrochloride thereof This compound is prepared as described in Example 42 by stirring at room temperature 2.5 g. of 2-chloromethyl-1,3-diazafluoranthene-1-oxide, 4.7 ml. of n-butylamine and 100 ml. of methanol. M.P.: 206–208° C.

The hydrochloride prepared by addition of ether to a solution of the base in chloroform to which a stoichiometric quantity of HCl (0.66 N solution in methanol) has been added. After recrystallization from a mixture of methanol and methylethylketone, the product melts at 215° C. (dec.).

The same product may be prepared by refluxing in tetrahydrofuran.

EXAMPLE 48

Preparation of 3-isobutylamino-2H-fluoreno-[1,9-ef]-1,4-diazepine-1-oxide and the hydrochloride thereof A mixture of 0.54 g. of 2-chloromethyl-1,3-diazafluoranthene-1-oxide, of 1 ml. of isobutylamine and of 20 ml. of anhydrous methanol is stirred at room temperature during 17 hours. The solution is then poured on ice and the precipitate is filtered, washed, dried and recrystallized from a mixture of benzene and cyclohexane. M.P.: 202–202.5° C. (dec.). Hydrochloride. M.P.: 211–212° C. (dec.).

EXAMPLE 49

Preparation of 3-n-amylamino-2H-fluoreno-[1,9-ef]-1,4-diazepine-1-oxide and the hydrochloride thereof This compound is prepared as described in Example 48, from 0.54 g. of 2-chloromethyl-1,3-diazafluoranthene-1-oxide, 20 ml. of anhydrous methanol and 1 ml. of n-amylamine. M.P.: 200–201° C. Hydrochloride. M.P.: 195–196° C. (dec.).

EXAMPLE 50

Preparation of 3-isoamylamino-2H-fluoreno-[1,9-ef]-1,4-diazepine-1-oxide and the hydrochloride thereof This compound is prepared as described in example 48, from 0.54 g. of 2-chloromethyl-1,3-diazafluoranthene-1-oxide, 20 ml. of anhydrous methanol and 1 ml. of isoamylamine. M.P.: 185–187° C. Hydrochloride. M.P.: 185–187° C. Hydrachloride: M.P.: 185–187° C. (dec.).

EXAMPLE 51

Preparation of 3-hexylamino-2H-fluoreno-[1,9-ef]-1,4-diazepine-1-oxide

A mixture of 0.72 g. of 2-chloromethyl-1,3-diazafluoranthene-1-oxide, of 40 ml. of anhydrous methanol and of 2 ml. of hexylamine is stirred at room temperature during 17.5 hours. The suspension is then treated as described in Example 48. Melting point: 178–179° C. (dec.). The hydrochloride melts at 181–182° C. (dec.).

EXAMPLE 52

Preparation of 3-hydrazino-2H-fluoreno-[1,9-ef]-1,4-diazepine-1-oxide

A mixture of 2.5 g. of 3-methoxy-2H-fluoreno-[1,9-ef]-1,4-diazepine-1-oxide, of 10 ml. of anhydrous hydrazine and of 100 ml. of absolute methanol is stirred at room temperature during 1 hour. The suspension is then poured on ice. After several recrystallizations from isopropanol, yellow-orange crystals melting at 272–275° C. (dec.). are obtained.

EXAMPLE 53

Preparations of 3-allylamino-2H-fluoreno-[1,9-ef]-1,4-diazepine-1-oxide and the hydrochloride thereof A mixture of 0.5 g. of 2-chloromethyl-1,3-diazafluoranthene-1-oxide, 2 ml. of allylamine and 20 ml. of methanol is stirred at room temperature during 66 hours. The obtained solution is concentrated to dryness and the residue is treated with water and filtered. The insoluble fraction is recrystallized from methanol. Yellow crystals melting at 187–189° C. (dec.) are obtained.

The hydrochloride is prepared by the usual method and, after recrystallization from a mixture of methanol and methylethylketone, it melts at 225–230° C. (dec.).

EXAMPLE 54

Preparation of 3-cyclohexylamino-2H-fluoreno-[1,9-ef]-1,4-diazepine-1-oxide 0.2 g. of sodium methylate are dissolved into 50 ml. of absolute methanol. To this solution are then added 0.36 g. of guanidine hydrochloride and 0.52 g. of 3-methoxy-2H-fluoreno-[1,9-ef]-1,4-diazepine-1-oxide. After refluxing the solution during 5 hours, the solution is poured on ice, and the obtained precipitate is filtered, washed, dried and recrystallized from methanol. Yellow orange crystals melting at 228–230° C. (dec.) are obtained.

EXAMPLE 55

Preparation of 3-cyclohexylamino-2H-fluoreno-[1,9-ef]-1,4-diazepine-1-oxide

A mixture of 0.52 g. of 3-methoxy-2H-fluoreno-[1,9-ef]-1,4-diazepine-1-oxide, of 2 ml. of cyclohexylamine and of 50 ml. of absolute methanol is refluxed during several hours. The solution is then poured on ice and the obtained precipitate is filtered, washed, dried and recrystallized from a mixture of cyclohexane and chloroform. M.P.: 219–220° C.

EXAMPLE 56

Preparation of 3-(2-furfurylamino)-2H-fluoreno-[1,9-ef]-1,4-diazepine-1-oxide

A mixture of 0.52 g. of 3-methoxy-2H-fluoreno-[1,9-ef]-1,4-diazepine-1-oxide, of 2 ml. of 2-furfurylamine and of 50 ml. of anhydrous methanol is refluxed during 24 hours. The mixture is then treated in the usual way. After recrystallizations from methanol, yellow needles melting at 190–192° C. are obtained. Yield. 80%.

EXAMPLE 57

Preparation of 3-(β-phenylethylamino)-2H-fluoreno-[1,9-ef]-1,4-diazepine-1-oxide and the hydrochloride thereof A mixture of 0.54 g. of 2-chloromethyl-1,3-diazafluoranthene-1-oxide, of 20 ml. of anhydrous methanol and of 2 ml. of β-phenylethylamine is stirred at room temperature during 26 hours. The suspension is then poured on ice and the precipitate is filtered, washed, dried and recrystallized several times from cyclohexane. Yellow microcrystals melting at 204– 205° C. are obtained with a yield of 80%.

The hydrochloride melts at 190–192° C. (dec.).

EXAMPLE 58

Preparation of 3-(N-β-morpholino)ethylamino-2H-fluoreno-[1,9-ef]-1,4-diazepine-1-oxide A mixture of 0.52 g. of 3-methoxy-2H-fluoreno-[1,9-ef]-1-4-diazepine-1-oxide, of 2 ml. of N-β-aminoethyl-morpholine and 50 ml. of anhydrous methanol is refluxed during 24 hours. The mixture is then treated in the usual manner. After recrystallization from cyclohexane-chloroform, the product melts at 165–166° C.

EXAMPLE 59

Preparation of 3-(β-diethylaminoethyl)-amino-2H-fluoreno-[1,9-ef]-1,4-diazepine-1-oxide A mixture of 0.52 g. of 3-methoxy-2H-fluoreno-[1,9-ef]-1,4-diazepine-1-oxide, of 2 ml. of β-diethylamino-ethylamine and 25 ml. of anhydrous methanol. The mixture is then treated in the usual way. M.P. 151–151.5° C.

EXAMPLE 60

Preparation of 3-benzylamino-2H-fluoreno-[1,9-ef]-1,4-diazepine-1-oxide and the hydrochloride thereof A mixture of 0.5 g. of 2-chloromethyl-1,3-diazafluoranthene-1-oxide, 2 ml. of benzylamine and 20 ml. of methanol is stirred at a room temperature during 17 hours. The obtained solution is concentrated to dryness and the residue is treated with water, and then filtered, dried and recrystallized with benzene. Yellow crystals melting at 204–205° C. are obtained.

The hydrochloride prepared by the usual method and recrystallized from methanol melts at 200–202° C. (dec.).

EXAMPLE 61

Preparation of 3 - (β - hydroxyethyl)amino-2H-fluoreno-[1,9 - ef] - 1,4 - diazepine - 1 - oxide and the hydrochloride thereof A mixture of 0.5 g. of 2-chloromethyl-1,3-diazofluoranthene-1-oxide, 2 ml. of ethanolamine and 20 ml. of methanol is stirred at room temperature during 64 hours. The mixture is then concentrated to dryness and the residue is treated with water. The filtered product is recrystallized from methanol. Yellow crystals melting at 190–192° C. with decomposition are obtained.

The hydrochloride of this product is prepared by the usual method. After recrystallisation from methanol-methylethylketone, this hydrochloride melts at about 205° C. (dec.).

EXAMPLE 62

Preparation of 3-pyrrolidino-2H-fluoroeno-[1,9-ef]-1,4-diazepine-1-oxide and the hydrochloride thereof A mixture of 0.5 g. of 2-chloromethyl-1,3-diazafluoranthene-1-oxide, 2 ml. of pyrrolidine and 20 ml. of methanol is stirred at room temperature during 17.5 hours. The obtained suspension is cooled by means of an ice bath and the insoluble product is filtered and recrystallized from isopropanol containing 10% of water. Yellow crystals melting at 204–205° C. (dec.) are obtained.

The hydrochloride is prepared by dissolving the base in the minimum amount of chloroform and by adding an alcoholic solution of hydrochloric acid until the pH reaches 3.5–4. Ether is then added for precipitating the hydrochloride which is recrystallized from a mixture of methanol and methylethylketone and melts at 212–215° C. (dec.).

EXAMPLE 63

Preparation of 3-piperidino-2H-fluoreno-[1,9-ef]-1,4-diazepine-1-oxide

A mixture of 2-chloromethyl-1,3-diazafluoranthene-1-oxide, 8 ml. of piperidine and 80 ml. of methanol is stirred during 17.5 hours at room temperature. The obtained solution is concentrated and the residue is treated with water. The filtered product is recrystallized from methanol. This product is obtained with a yield of 78% (1.85 g). and melts at 204–205° C. with decomposition.

EXAMPLE 64

Preparation of 3-hexamethyleneimino-2H-fluoreno-[1,9-ef]-1,4-diazepine-1-oxide

A mixture of 0.5 g. of 2-chloromethyl-1,3-diazafluoranthene-1-oxide, 2 ml. of hexamethyleneimine and 200 ml. of methanol is stirred during 17 hours at room temperature. The obtained solution is concentrated to dryness and the residue is treated with water. After filtration, the product is recrystallized first from a mixture of benzene and cyclohexane and then with a mixture of isopropanol and water (10%). The yellow crystals melt at 214–216° C. with decomposition.

The same compound has been also obtained from 3-methoxy-2H-fluoreno-[1,9-ef]-1,4-diazepine-1-oxide.

EXAMPLE 65

Preparation of 3-(N-methylpiperazinyl)-2H-fluoreno-[1,9-ef]-1,4-diazepine-1-oxide A mixture of 540 mg. of 2-chloromethyl 1,3-diazafluoranthene-1-oxide, 0.22 g. of N-methylpiperazine and 25 ml. of anhydrous $CH_3OH$ is stirred during 45 hours. The suspension is then poured on ice and the pkrecipitate is filtered. After drying of the precipitate (420 mg.), it is recrystallized from methylethylketone. The product melts at 219.5–220° C. Yield: 64%.

From the mother-liquors of the recrystallization, it is possible to recover by extraction with chloroform 2-(N-methylpiperazinyl) - 1,3 - diazafluoranthene - 1 - oxide, melting at 139–141° C. It is also possible to obtain 3-(N-methylpiperazinyl) - 2H - fluoreno - [1,9 - ef] - 1,4 - diazepine - 1 - oxide from 3 - methoxy - 2H - fluoreno - [1,9 - ef] - 1,4 - diazepine - 1 - oxide, N-methylpiperazine and methanol.

EXAMPLE 66

Preparation of 3-ethyleneimino-2H-fluoreno-[1,9-ef]-1,4-diazepine-1-oxide

A mixture of 0.52 g. of 3-methoxy-2H-fluoreno-[1,9-ef]-1,4-diazepine-1-oxide, of 2 ml. of ethyleneimine and of 50 ml. of absolute methanol is refluxed during 47 hours. The suspension is poured on ice and the precipitate is filtered, washed, dried and recrystallized from cyclohexane-chloroform. Microcrystals melting at 188–190° C. are obtained.

EXAMPLE 67

Preparation of 3-morpholino-2H-fluoreno-[1,9-ef]-1,4-diazepine-1-oxide

A mixture of 0.52 g. of 3-methoxy-2H-fluoreno-[1,9-ef]-1,4-diazepine-1-oxide, of 20 ml. of anhydrous methanol and of 2 ml. of morpholine is stirred during 89 hours. The solution is then treated in the usual way. After crystallization from ethanol, yellow microcrystals melting at 239–241° C. are obtained with a yield of 80%.

EXAMPLE 68

Preparation of 3-piperazino-2H-fluoreno-[1,9-ef]-1,4-diazepine-1-oxide and the hydrochloride thereof A mixture of 0.52 g. of 3-methoxy-2H-fluoreno-[1,9-ef]-1,4-diazepine-1-oxide, 2 g. of piperazine and of 50 ml. of anhydrous methanol is refluxed during 24 hours. The mixture is then treated in the usual way. Yellow crystals melting at 208–210° C. are obtained after recrystallizations from methanol.

The hydrochloride melts at 215–217° C. (dec.) after several recrystallizations from methanol.

EXAMPLE 69

Preparation of 3-(2-methyl-N-piperazinyl)-2H-fluoreno-[1,9-ef]-1,4-diazenpine-1-oxide A mixture of 0.52 g. of 3-methoxy-2H-fluoreno-[1,9-ef]-1,4-diazepine-1-oxide, of 2 g. of 2-methylpiperazine and of 50 ml. of anhydrous methanol is refluxed during 19 hours. The mixture is then diluted with water and extracted by means of chloroform. The chloroform solution is washed, dried and evaporated to dryness. After recrystallization from cylohexane, yellow crystals melting at 185–197° C. are obtained. Yield: 100%.

EXAMPLE 70

Preparation of 3-(N-β-hydroxyethyl piperazinyl)-2H-fluoreno-[1,9-ef]-1,4-diazepine-1-oxide A mixture of 2 g. of 3-methoxy-2H-fluoreno-[1,9-ef]-1,4-diazepine-1-oxide, of 8 ml. of N-β-hydroxyethylpiperazine and of 80 ml. of absolute methanol. The solution is then poured on ice and the obtained precipitate is filtered, washed and dried. After several recrystallization from methylethylketone, the product melts at 213–215° C.

EXAMPLE 71

Preparation of 3-(N-benzylpiperazinyl)-2H-fluoreno-[1,9-ef]-1,4-diazepine-1-oxide A mixture of 0.52 g. of 3-methoxy-2H-fluoreno-[1,9-ef]-1,4-diazepine-1-oxide, of 2 ml. of N-benzylpiperazine and of 50 ml. of anhydrous methanol is refluxed during 24 hours. The mixture is then treated in the usual way. M.P.: 17–180° C., (ethanol). Yield: 80%.

EXAMPLE 72

Preparation of the 7-chloro-3-amino-2H-fluoreno-[1,9-ef]-1,4-diazepine-1-oxide 2 g. of 6-chloro-2-chloromethyl-1,3-diazafluoranthene are stirred during 7 days at room temperature in 100 ml. of methanol saturated with gaseous ammonia. The suspension is then poured on ice and the obtained precipitate is filtered, washed and dried. After several recrystallizations from methylethylketone, yellow flakes are obtained, said flakes containing 1 molecule of water and melting at more than 330° C. (dec.). Yield: 90%.

EXAMPLE 73

Preparation of 7-chloro-3-dimethylamino-2H-fluoreno-[1,9-ef]-1,4-diazepine-1-oxide and the hydrochloride thereof 600 mg. (0.002 mole) of 6-chloro-2-chloromethyl-1,3-diazafluoranthene-1-oxide are stirred during 16 hours in 15 ml. of 33% solution of dimethylamine in ethanol. The solution is then poured on ice and the obtained precipitate is filtered, dried under vacuum and recrystallized from a mixture of benzene and cyclohexane. The obtained product melts at 201–201.5° C. Yield: 90%.

The hydrochloride is prepared by the usual method. After recrystallization from a mixture of methanol and ether, yellow microcrystals melting at about 220° C. (dec.) are obtained.

EXAMPLE 74

Preparation of 7-chloro-3-methylamino-2H-fluoreno-[1,9-ef]-1,4-diazepine-1-oxide and the hydrochloride thereof In a vessel of a capacity of 50 ml. equipped with a magnetic stirrer 600 mg. (0.002 mole) of 6-chloro-2-chloromethyl-1,3-diazafluoranthene-1-oxide and 15 ml. of 33% solution of methylamine in ethanol are placed. The mixture is stirred during 69 hours at room temperature and the obtained suspension is then poured on ice. The obtained product is filtered and dried under vacuum. 480 mg. of a product melting at 230° C. (dec.) after a recrystallization from acetone are obtained. Yield: 80%.

The hydrochloride is prepared by dissolving the base in acetone and adding a stoichiometric quantity of hydrochloric acid dissolved in methanol (2 N). The hydrochloride precipitates in a mixture of methanol and ether. Yellowish microcrystals melting at about 230° C. (dec.) are obtained.

EXAMPLE 75

Preparation of 7-chloro-3-ethylamino-2H-fluoreno-[1,9-ef]-1,4-diazepine-1-oxide and the hydrochloride thereof 600 mg. (0.002 mole) of 6-chloro-2-chloro-methyl-1,3-diazafluoranthene-1-oxide in 20 ml. of a 20% solution of ethylamine in ethanol are stirred during 21 hours. The product is separated as described in Example 74. 620 mg. of a product melting at 220° C., after recrystallization from methylethylketone, are obtained. Yield: 100%.

The hydrochloride is prepared as described in Example 34. After recrystallization from a mixture of methanol and ether, said hydrochloride melts at about 215° C. (dec.).

EXAMPLE 76

Preparation of 7-chloro-3-propylamino-2H-fluoreno-[1,9-ef]-1,4-diazepine-1-oxide and the hydrochloride thereof 600 mg. (0.002 mole) of 6-chloro-2-chloromethyl-1,3-diazafluoranthene-1-oxide are stirred during 16 hours in the presence of 1 ml. of propylamine and 20 ml. of anhydrous CH₃OH. The product is separated as described in Example 75 and recrystallized from benzene. Melting point: 207–207.5° C. Yield: 93%. The hydrochloride of this product melts at 198–199° C.

The hydrochloride of this product melts at 198–199° C. (dec.).

The reaction may also be carried out in dioxane, chloroform, benzene or tetrahydrofurane.

EXAMPLE 77

Preparation of 7-chloro-3-butylamino-2H-fluoreno-[1,9-ef]-1,4-diazepine-1-oxide and the hydrochloride thereof 600 mg. (0.002 mole) of 6-chloro-2-chloromethyl-1,3-diazafluoranthene-1-oxide are stirred during 15 hours in the presence of 1 ml. of n-butylamine and 20 ml. of anhydrous methanol. The product is isolated as in Example 74 and purified by recrystallization in a mixture of carbon tetrachloride and benzene. The product melts at 203.5–204.5° C. Yield: 89%. The hydrochloride of this compound melts at 198–199° C. (dec.). The same product may be obtained starting from 7-chloro-3-methoxy-2H-fluoreno-[1,9-ef]-1,4-diazepine-1-oxide and methylamine.

EXAMPLE 78

Preparation of 7-chloro-3-allylamino-2H-fluoreno-[1,9-ef]-1,4-diazepine-1-oxide and the hydrochloride thereof 600 mg. (0.002 mole) of 6-chloro-2-chloromethyl-1,3-diazafluoranthene-1-oxide are stirred in the presence of 2 ml. of allylamine in 20 ml. of anhydrous methanol during 45 hours. The product is isolated as described in Example 34 and purified by recrystallization from a mixture of acetone and methylethylketone. The product melts at about 220° C. (dec.). Yield: 94%. The hydrochloride of this compound melts at 230° C. (dec.).

EXAMPLE 79

Preparation of 7-chloro-3-piperidino-2H-fluoreno-[1,9-ef]-1,4-diazepine-1-oxide

A mixture of 0.6 g. of 6-chloro-2-chloromethyl-1,3-diazafluoranthene-1-oxide, of 25 ml. of anhydrous methanol and of 2 ml. of piperidine is stirred during 17 hours, at room temperature. The solution is then poured on ice and the obtained precipitate is filtered, washed, dried and recrystallized several times from isopropanol. The product melts at 202.5–203° C.

EXAMPLE 80

Preparation of 7-chloro-3-benzylamino-2H-fluoreno-[1,9-ef]-1,4-diazepine-1-oxide and the hydrochloride thereof A mixture of 600 mg. (0.002 mole) of 6-chloro-2-chloromethyl-1,3-diazafluoranthene-1-oxide, 2 ml. of benzylamine and 20 ml. of anhydrous methanol is stirred during 17 hours. 680 mg. of a product melting at 202.5–203° C. after recrystallization of methylethylketone are obtained. Yield: 92%.

After recrystallization from a mixture of methanol and ether, the hydrochloride is obtained as yellow microcrystals melting at about 225° C. (dec.).

EXAMPLE 81

Preparation of 7 - chloro - 3 - pyrrolidino -2H - fluoreno [1,9 - ef] - 1,4 - diazepine - 1 - oxide and the hydrochloride thereof.

During 17.30 hours, 600 mg. (0.002 mole) of 6-chloro-2 - chloromethyl - 1,3 - diazafluoranthene - 1 - oxide are stirred in the presence of 2 ml. of pyrrolidine in 20 ml. of anhydrous methanol. The mixture is then poured on ice and the obtained precipitate is filtered, dried under vacuum and recrystallized from acetone. The product melts at 201–202° C. with decomposition (yellow needles). Yield: 98%.

The hydrochloride is prepared by the usual method and after crystallization from a mixture of methanol and ether, the product melts at 215° C. (dec.).

EXAMPLE 82

Preparation of 7-chloro-3-(N-benzylpiperazinyl)-2H-fluoreno[1,9-ef]-1,4-diazepine-1-oxide A mixture of 0.6 g. of 7-chloro-3-methoxy-2H-fluoreno [1,9 - ef] - 1,4 - diazepine - 1 - oxide, of 25 ml. of anhydrous methanol and of 2 ml. of N-benzylpiperazine is refluxed during a few hours. The solution is then poured on ice and the obtained precipitate is filtered, washed, dried and recrystallized several times from benzene. M.P.: 203–204° C. Yield: 99%.

EXAMPLE 83

Preparation of 7 - chloro - 3 - piperazino - 2H - fluoreno [1,9 - ef] - 1,4 - diazepine - 1 - oxide and the hydrochloride thereof A mixture of 0.6 g. of 7-chloro-3-methoxy-2H-fluoreno [1,9 - ef] - 1,4 - diazepine - 1 - oxide, of 25 ml. of anhydrous methanol and of 2 g. of anhydrous piperazine is refluxed during 24 hours. The solution is then poured on ice and the obtained precipitate is filtered, washed, dried and recrystallized several times from cyclohexane-chloroform. M.P.: 204–205°C.

The hydrochloride melts at 220–221° C. after recrystallizations from methanol ethyl ether.

EXAMPLE 84

Preparation of 7-chloro-3-(N-methylpiperazinyl)-2H-fluoreno[1,9-ef]-1,4-diazepine-1-oxide A mixture of 0.6 g. of 7-chloro-3-methoxy-2H-fluoreno [1,9-ef]-1,4-diazepine-1-oxide, of 25 ml. of anhydrous methanol and of 2 ml. of N-methylpiperazine is refluxed during 30 hours. The solution is then poured on ice and the obtained precipitate is filtered, washed, dried and recrystallized several times from cyclohexane-chloroform. M.P.: 203–204°C.

EXAMPLE 85

Preparation of 7-chloro-3-(N-α-hydroxyethyl piperazinyl) 2H-fluoreno[1,9-ef]-1,4-diazepine-1-oxide A mixture of 0.6 g. of 7-chloro-3-methoxy-2H-fluoreno [1,9-ef]-1,4-diazepine-1-oxide, of 25 ml. of anhydrous methanol and of 2 ml. of N-β-hydroxyethylpiperazine is refluxed during 30 hours. The solution is then poured on ice and the obtained precipitates is filtered, washed, dried and recrystallized several times from cyclohexane-chloroform. M.P.: 202–203° C.

EXAMPLE 86

Preparation of 5-chloro-3-amino-2H-fluoreno[1,9-ef]-1,4-diazepine-1-oxide

A mixture of 2 g. of 4-chloro-2-chloromethyl-1,3-diazafluoranthene-1-oxide with 100 ml. of methanol saturated with gaseous ammonia. The suspension is then poured on ice and the obtained precipitate is filtered, washed, dried and recrystallized several times from methyl ethyl ketone. M.P.: 245° C. (dec.).

EXAMPLE 87

Preparation of 5 - chloro - 3 - ethylamino - 2H - fluoreno [1,9-ef]-1,4-diazepine-1-oxide and the hydrochloride thereof A mixture of 0.6 g. of 4-chloro-2-chloromethyl-1,3-diazafluoranthene-1-oxide and of 20 ml. of a 20% solution of ethylamine in methanol is stirred at room temperature during 17 hours. The solution is then treated in the usual manner. M.P. 216–216.5° C. (recrystallization from cyclohexane). Yield: 99%.

The hydrochloride melts at 193–194° C. (dec.).

EXAMPLE 88

Preparation of 5 - chloro - 3 - n - propylamino - 2H-fluoreno[1,9-ef]-1,4-diazepine-1-oxide and the hydrochloride thereof A mixture of 0.6 g. of 4-chloro-2-chloromethyl-1,3- diazafluoranthene-1-oxide and of 25 ml. of anhydrous methanol containing 1 ml. of n-propylamine is stirred at room temperature during 68 hours. The solution is then treated in the usual manner. M.P. 196.5–197.5° C.

The hydrochloride (which contains 1 molecule of methanol) melts at 182–183° C. (dec.) of recrystallization from methanol-ether.

EXAMPLE 89

Preparation of 5-chloro-3-n-butylamino-2H-fluoreno [1,9-ef]-1,4-diazepine-1-oxide This compound is prepared as described in Example 88, using n-butylamine in place of n-propylamine. M.P. 192–193° C. The hydrochloride melts at 175–176° C. (dec.).

EXAMPLE 90

Preparation of 5 - chloro - 3 - methylamino - 2H - fluoreno [1,9-ef]-1,4-diazepine-1-oxide and the hydrochloride thereof A mixture of 4-chloro-2-chloromethyl-1,3-diazafluoranthene-1-oxide with 15 ml. of an alcoholic solution containing 33% of methylamine is stirred during 70 hours and the obtained solution is poured on ice. The obtained precipitate is filtered, washed, dried and purified by several crystallizations from a mixture of benzene and petroleum ether. The final product (yellow crystals) melts at 212–214° C. The yield is practically quantitative. The hydrochloride melts at about 220° C. (dec.).

EXAMPLE 91

Preparation of 5-chloro-3-pyrrolidino-2H-fluoreno[1,9-ef] 1,4-diazepine-1-oxide and the hydrochloride thereof A mixture of 0.5 g. of 4-chloro-2-chloromethyl-1,3-diazafluoranthene-1-oxide, 2 ml. of pyrrolidine and 20 ml. of absolute methanol is stirred during 17 hours and the obtained solution is then poured on ice. The obtained precipitate is filtered, washed, dried and recrystallized from a mixture of benzene and petroleum ether. Yellow crystals melting at 202–204° C. are obtained, the yield being nearly quantitative. The hydrochloride melts at 117–178° C. (dec.).

EXAMPLE 92

Preparation of 5-chloro-3-dimethylamino-2H-fluoreno-[1,9-ef]-1,4-diazepine-1-oxide and the hydrochloride thereof A mixture of 500 mg. of 4-chloro-2-chloromethyl-1,3-diazafluoranthene-1-oxide and 500 mg. of an alcoholic solution of dimethylamine is stirred during 18 hours, and then poured on ice. The obtained precipitate is filtered, washed and recrystallized from a mixture of benzene and cyclohexane. The yellow product melts at 204–204.5° C. The yield is practically quantitative. The hydrochloride melts at 183–184° C. (dec.).

EXAMPLE 93

Preparation of 7-chloro - 3 - methylamino-2H-2-methylfluoreno-[1,9-ef]-1,4-diazepine-1-oxide and the hydrochloride thereof 0.48 g. of 6-chloro-2-(α-chloroethyl)-1,3-diazafluoranthene-1-oxide are stirred during 47 hours with 15 ml. of a 33% solution of methylamine in ethanol. The reaction mixture is then poured on ice. The obtained precipitate is filtered, washed and recrystallized from a mixture of carbon tetrachloride and petroleum ether. The product melts at 210.5–211° C. The hydrochloride of this product melts at 235° C. (dec.).

EXAMPLE 94

Preparation of 5-chloro-3-piperazino-2H-fluoreno-[1,9-ef]-diazepine-1-oxide

A mixture of 0.55 g. of 5-chloro-3-methoxy-2H-fluoreno-[1,9-ef]-1,4-diazepine-1-oxide, of 2 g. of piperazine and of 30 ml. of anhydrous methanol is refluxed during 3 hours. The solution is then treated in the usual way. M.P. (after recrystallization from cyclohexane and chloroform): 197–198° C.

EXAMPLE 95

Preparation of 5-chloro-3-(N-methylpiperazinyl)-2H-fluoreno-[1,9-ef]-1,4-diazepine-1-oxide A mixture of 0.6 g. of 5-chloro-3-methoxy-2H-fluoreno-[1,9-ef]-1,4-diazepine-1-oxide, of 2 ml. of N-methylpiperazine and of 30 ml. of anhydrous methanol is refluxed during 7 hours. The solution is then treated in the usual way. After recrystallizations from cyclohexane-chloroform, the product melts at 199–200° C.

EXAMPLE 96

Preparation of 5-chloro-3-[N-(β-hydroxyethyl)piperazinyl]-2H-fluoreno-[1,9-ef]-1,4-diazepine-1-oxide This compound is prepared as described in Example 95, using N-(β-hydroxyethyl)piperazine in place of N-methylpiperazine. M.P.: 197–197.5° C.

EXAMPLE 97

Preparation of 5-chloro-3-(N-benzylpiperazinyl)-2H-fluoreno-[1,9-ef]-1,4-diazepine-1-oxide This compound is prepared as described in Example 95, using N-benzylpiperazine (2 ml.) in place of N-methylpiperazine. M.P.: 179.5–180° C.

EXAMPLE 98

Preparation of 5-chloro-3-methylamino-2H-2-methylfluoreno-[1,9-ef]-1,4-diazepine-1-oxide 0.6 g. of 4-chloro-2-chloromethyl-1,3-diazafluoranthene-1-oxide in 15 ml. of 33% solution of methylamine in ethanol are stirred during 24 hours. The solution is then poured on ice and the obtained precipitate is filtered, washed, dried and recrystallized from a mixture of cyclohexane and petroleum ether. Yellow crystals melting at 211–213° C., are obtained.

EXAMPLE 99

Preparation of 5-chloro-3-methoxy-2H-fluoreno-[1,9]-1,4-diazepine-1-oxide

A mixture of 0.6 g. of 4-chloro-2-chloromethyl-1,3-diazafluoranthene-1-oxide, of 2 ml. of triethylamine and of 50 ml. of anhydrous methanol is refluxed during 48 hours. The solution is then poured on ice and the precipitate is filtered, washed and dried. The product is then chromatographed on a silicia gel column. After elution with benzene and several recrystallizations from cyclohexane, the product melts at 156.5°–157° C.

EXAMPLE 100

Preparation of:
(1°) 2-piperidinoethyl-1,3-diazafluoranthene-1-oxide, and
(2°) 3 - piperidino-2H-fluoreno-[1,9-ef]-1,4-diazepine-1-oxide.

A mixture of 2 g. of 2-chloromethyl-1,3-diazafluoranthene-1-oxide, of 8 ml. of anhydrous piperidine and of 80 ml. of absolute methanol is stirred during 18 hours. The suspension is then poured on ice and the obtained precipitate is filtered, washed and dried. After recrystallization from cyclohexane, the compound (2) is obtained with a yield of 42%. By treating the mother-liquors of the recrystallization with cyclohexane, the compound 1 is obtained with a yield of 34%.

EXAMPLE 101

Preparation of:
(1°) 3-(N-β-hydroxyethylpiperazino)-2H-fluoreno-[1,9-ef]-1,4-diazepine-1-oxide and of
(2°) 2 - (N - β-hydroxyethyl)piperazinomethyl-1,3-diazafluoranthene-1-oxide.

A mixture of 3 g. of 2-chloromethyl-1,3-diazafluoranthene-1-oxide, of 120 ml. of anhydrous methanol and of 12 ml. of N-β-hydroxyetyhl piperazine is stirred at room temperature during 72 hours. The solution is then poured on ice and the obtained precipitate is filtered, washed and dried. After recrysstallizations from a mixture of cyclohexane and chloroform, the product (1) melting at 214–215° C. is obtained.

The filtrate is extracted with chloroform and the chloroform solution is washed, dried and evaporated to dryness. The residue is recrystallized several times from methanol. The crystals of the product (2) so obtained melt at 159–161° C. Yield: 65%.

EXAMPLE 102

Preparation of 2-methylamino-2H-2-methyl-fluoreno-[1,9-ef]-1,4-diazepine-1-oxide and the hydrochloride thereof A mixture of 0.5 g. of 2-(α-chloroethyl)-1,3-diazafluoranthene-1-oxide and 15 ml. of a 33% solution of methylamine in ethanol is stirred during 24 hours. The solution is then poured on ice and the obtained precipitate is filtered, dried and recrystallized from benzene.

The obtained product is chromatographed on silicia gel, the column being eluted first by means of benzene and then by means of chloroform. The product is purified by recrystallizations from mixtures of benzene and petroleum ether. Yellow microcrystals melting at 127–129° C. are obtained.

The hydrochloride of this compound is prepared by dissolving it in a minimum quantity of chloroform and by treating the solution with a stoichiometric quantity of HCl dissolved of methanol (2 N). The hydrochloride is precipitated by means of ether. The product is then purified by recrystallization from a mixture of ethanol and methyl ethyl ketone. Yellow crystals melting at 220–222° C. (dec.) are obtained.

Many compounds according to this invention, namely compounds of the Formulae I, II and IV have been tested in order to determine the pharmacological properties thereof. Said compounds have an obvious effect on the spontaneous motility, which is reduced very strongly in certain cases. This sedative and sometimes hypnotic action is confirmed by special test such as the rota-rod test and the Courvoisier pulling test.

These products have also a protecting action on the electroshock, as well an hypothermic action.

Further tests have shown that compounds of the Formulae I and II, namely the 3-methylamino-2H-fluoreno-[1,9-ef]-1,4-diazepine-1-oxide hydrochloride, the 3-propylamino-2H-fluoreno-[1,9-ef]-1,4-diazepine-1 - oxide hydrochloride, the 3-allylamino-2H-fluoreno-[1,9-ef]-1,4-diazepine-1-oxide hydrochloride, the 3-benzyl-2H-fluoreno-[1,9-ef]-1,4-diazepine-1-oxide hydrochloride, the 2-morpholinomethyl-1,3-diazafluoranthene-1-oxide, the 2-piperidinomethyl-1,3-diazafluoranthene-1-oxide, the 5-chloro-3-ethylamino-2H-fluoreno-[1,9-ef]-1,4 - diazepine-1-oxide hydrochloride, the 7-chloro-3-n-propylamino-2H-fluoreno-[1,9-ef]-1,4-diazepine-1-oxide hydrochloride and the 3-methoxy-2H-fluoreno-[1,9-ef]-1,4-diazepine-1-oxide, have tranquilizing, anti-convulsive, anti-Parkinson and anti-spasmodic effects.

Under these circumstances, the compounds according to this invention represented by the Formulae I, II and IV may be used notably in sedative or tranquilizing compositions, in hypnotic or prenarcotic compositions and also in anti-convulsive or anti-Parkinson or anti-spasmodic compositions.

The invention includes therefore the pharmaceutical compositions containing as active ingredient at least one compound of the Formulae I, II or IV.

The new compounds of this invention of the Formulae I, II and IV may be administered by intramuscular or intravenous route.

I claim:

1. A compound selected from the group consisting of (A) a fluorene - [1,9-ef] - 1,4 - diazepine-1-oxide of the formula:

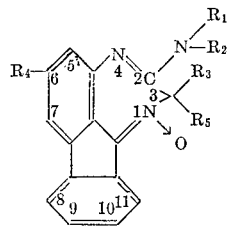

in which each of $R_3$ and $R_5$ is independently either hydrogen or a lower alkyl group; $R_4$, which is one of the positions 5 and 7, is either hydrogen or a halogen; each of $R_1$ and $R_2$ is, independently, either hydrogen, lower alkyl containing 1 to 6 carbon atoms, allyl, benzyl, phenethyl, hydroxy lower alkylamino, guanidino or furfuryl or $R_1$ and $R_2$ form, together with the adjacent nitrogen atom, (1) a diloweralkylaminoloweralkylamino group, (2) a group of the formula NH-loweralkylene-N⟨ ⟩ or (3) a group of the formula N⟨ ⟩, in which N⟨ ⟩ is a nitrogen-containing monocyclic heterocycle selected from the group consisting of ethyleneimino, morpholino, piperidino, pyrrolidino, hexamethyleneimino, N-methylpiperazino, N-β-hydroxyethylpiperazino and N-benzylpiperazino; and (B) an acid addition salt thereof.

2. A fluoreno-[1,9-ef]-1,4-diazepine-1-oxide of Formula I as claimed in claim 1, in which each of $R_3$ and $R_5$ is, independently, hydrogen or methyl and $R_4$ is a chlorine atom.

3. 3 - methylamino - 2H - fluoreno - [1,9-ef] - 1,4-diazepine-1-oxide or the hydrochloride thereof.

4. 3 - propylamino - 2H - fluoreno - [1,9-ef] - 1,4-diazepine-1-oxide or the hydrochloride thereof.

5. 3 - allylamino - 2H - fluoreno - [1,9-ef] - 1,4-diazepine-1-oxide or the hydrochloride thereof.

6. 3 - benzylamino - 2H - fluoreno - [1,9-ef] - 1,4-diazepine-1-oxide or the hydrochloride thereof.

7. A 1,3-diazafluoranthene-1-oxide of the formula:

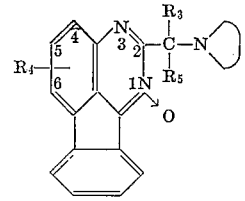

(II)

in which each of $R_3$ and $R_5$ is, independently, hydrogen or lower alkyl; $R_4$ is a halogen; and N⟨ ⟩ is a nitrogenous monocyclic heterocyclic selected from the group consisting of piperidino, hexamethyleneimino, morpholino and piperazino radicals.

8. A 1,3-diazafluoranthene-1-oxide of the Formula II as claimed in claim 7, in which each of $R_3$ and $R_5$ is, independently, hydrogen or methyl and $R_4$ is chlorine in one of the positions 4 and 6.

9. 2-morpholinomethyl-1,3-diazafluoranthene-1-oxide.

10. 2-piperidinomethyl-1,3-diazafluoranthene-1-oxide.

11. A 1,3-diazofluoranthene-1-oxide of the formula:

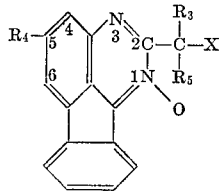

(II)

in which each of $R_3$ and $R_5$ is, independently, hydrogen or lower alkyl; $R_4$ is hydrogen or a halogen, $R_4$ being in one of the positions 4 and 6; and X is a halogen.

12. A compound according to claim 11 wherein each of $R_3$ and $R_5$ is, independently, a member selected from the group consisting of hydrogen and methyl; $R_4$ is chloine; and X is a halogen selected from the group consisting of chlorine and bromine.

13. A 3-alkoxy - 2H - fluoreno-[1,9-ef]-1,4-diazepine-1-oxide of the formula:

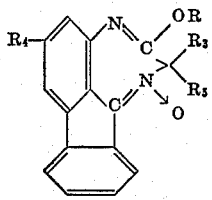

in which R is lower alkyl; $R_4$ is hydrogen or a halogen; and each of $R_3$ and $R_5$ is, independently, hydrogen or lower alkyl.

14. A compound according to claim 13 wherein $R_4$ is chlorine and each of $R_3$ and $R_5$ is, independently, a member selected from the group consisting of hydrogen and methyl.

15. 3-methoxy - 2H - fluoreno-[1,9-ef]-1,4-diazepine-1-oxide.

References Cited

UNITED STATES PATENTS

| | | | |
|---|---|---|---|
| 3,296,252 | 1/1967 | Frey et al. | 260—239.3 |
| 2,893,992 | 7/1959 | Sternbach | 260—239 |
| 3,329,676 | 7/1967 | Bell et al. | 260—239.3 |

OTHER REFERENCES

Cook and Moffatt, "J. Chem. Soc." (1950), pp. 1160–1170.

HENRY R. JILES, Primary Examiner

R. T. BOND, Assistant Examiner

U.S. Cl. X.R.

260—247.5, 251, 256.4, 268, 293, 326.81, 347.7, 562, 566, 578; 424—244, 248, 251, 267, 274, 285